United States Patent
Sun et al.

(10) Patent No.: US 9,063,869 B2
(45) Date of Patent: Jun. 23, 2015

(54) METHOD AND SYSTEM FOR STORING AND REBUILDING DATA

(71) Applicant: Industrial Technology Research Institute, Hsinchu (TW)

(72) Inventors: Hou-Chiang Sun, New Taipei (TW); An-Nan Chang, Hsinchu (TW); Ting-Fang Chien, Taoyuan County (TW); Shih-Chiang Tsao, Hsinchu (TW); Chyi-Fan Jhun, New Taipei (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 443 days.

(21) Appl. No.: 13/719,759

(22) Filed: Dec. 19, 2012

(65) Prior Publication Data

US 2014/0164695 A1 Jun. 12, 2014

(30) Foreign Application Priority Data

Dec. 10, 2012 (TW) .............................. 101146408 A

(51) Int. Cl.
*G06F 11/00* (2006.01)
*G06F 11/10* (2006.01)

(52) U.S. Cl.
CPC ............ *G06F 11/10* (2013.01); *G06F 11/1088* (2013.01)

(58) Field of Classification Search
USPC .......................................... 714/6.1, 6.2, 6.22
See application file for complete search history.

(56) References Cited

U.S. PATENT DOCUMENTS

| 5,875,456 A | 2/1999 | Stallmo et al. |
| 6,542,960 B1 | 4/2003 | Wong et al. |
| 6,665,743 B2 | 12/2003 | Benhase et al. |
| 7,047,358 B2 | 5/2006 | Lee et al. |
| 7,234,024 B1 | 6/2007 | Kiselev |
| 7,574,554 B2 | 8/2009 | Tanaka et al. |
| 8,074,112 B1 | 12/2011 | Chang et al. |
| 8,239,645 B1 | 8/2012 | Sade et al. |
| 2003/0120864 A1 | 6/2003 | Lee et al. |

(Continued)

FOREIGN PATENT DOCUMENTS

| EP | 0619897 B1 | 11/1996 |
| TW | 200707186 A | 2/2007 |

(Continued)

OTHER PUBLICATIONS

DifferentialRAID: Rethinking RAID for SSD Reliability, Mahesh Balakrishnan, Asim Kadav, Vijayan Prabhakaran, and Dahlia Malkhi, ACM Transactions on Storage (TOS), Jul. 2010, Article No. 4.

(Continued)

*Primary Examiner* — Sarai Butler
(74) *Attorney, Agent, or Firm* — Lin & Associates IP, Inc.

(57) ABSTRACT

According to one exemplary embodiment, a method for storing and rebuilding data computes a corresponding parity after receiving an Input/Output command, and based on the parity, determines whether a final stripe corresponding to the Input/Output command is a full stripe. When the final stripe is a full stripe, a plurality of data and a parity corresponding to the Input/Output command are stored into a main hyper erase unit (HEU) in a disk storage system. When the final stripe is not a full stripe, a final parity is re-computed and written into at least two parity pages of a buffering HEU.

25 Claims, 14 Drawing Sheets

(56) References Cited

U.S. PATENT DOCUMENTS

| | | | |
|---|---|---|---|
| 2003/0236943 A1 | 12/2003 | Delaney | |
| 2005/0091556 A1* | 4/2005 | Frolund et al. | 714/2 |
| 2010/0017650 A1 | 1/2010 | Chin et al. | |
| 2011/0126045 A1 | 5/2011 | Bennett | |
| 2011/0219178 A1 | 9/2011 | Eggleston et al. | |
| 2012/0084504 A1 | 4/2012 | Colgrove et al. | |
| 2012/0151253 A1 | 6/2012 | Horn | |
| 2013/0205168 A1* | 8/2013 | Blaum et al. | 714/6.24 |
| 2014/0156966 A1* | 6/2014 | Ellis et al. | 711/173 |

FOREIGN PATENT DOCUMENTS

| | | |
|---|---|---|
| TW | I317475 B | 11/2009 |
| TW | 201227298 A | 7/2012 |
| WO | 2012044489 A1 | 4/2012 |

OTHER PUBLICATIONS

An integrated performance model of disk arrays, Varki, F; Merchant, A.; Xu, J.; Qiu, X. Modeling, Analysis and Simulation of Computer Telecommunications Systems, 2003, 2003, p. 296-p. 305.

Hystor: making the best use of solid state drives in high performance storage systems, Feng Chen and David A. Koufaty and Xiaodong Zhang, ICS '11 Proceedings of the international conference on Supercomputing, 2011, p. 22-p. 32

Improving RAID Performance Using a Multibuffer Technique, Kien A. Hua and Khanh Vu and Ta-Hsiung Hu, ICDE'99 Mar. 1999, p. 79-p. 86.

Flash-Aware RAID Techniques for Dependable and High-Performance Flash Memory SSD, Soojun Im, Dongkun Shin Computers, IEEE Transactions, Jan. 2011, p. 80-p. 92.

Taiwan Patent Officem, Office Action, Patent Application Serial No. TW101146408, Aug. 7, 2014, Taiwan.

* cited by examiner

METHOD AND SYSTEM FOR STORING AND REBUILDING DATA

CROSS-REFERENCE TO RELATED APPLICATION

The present application is based on, and claims priority from, Taiwan Patent Application No. 101146408, filed Dec. 10, 2012, the disclosure of which is hereby incorporated by reference herein in its entirety.

TECHNICAL FIELD

The present disclosure relates generally to a method and system for storing and rebuilding data.

BACKGROUND

The redundant array of independent disks (RAID) is a technology combining hardware and software to enhance fault tolerance for storing and protecting data when a disk failure occurs, such as, crash or damaged. The RAID technology assembles a plurality of disks with a relatively low price to form a software disk array so that the performance reaches or even over a single large disk at a high price. The RAID technology may save the data and the corresponding parity when crossing each disk. A protection stripe includes a series of pages from different disks. A page is a unit for data storing in a disk. The stripe size is defined as the number of disk drives in a disk array. The RAID technology often uses a round-robin scheme to ensure each stripe is distributed evenly to each disk.

Adding a parity block to a set of source bits may ensure the number of set bits of the output outcome is even or odd, and the number of set bits is the number of bits having the value 1. An error correction code (ECC, or parity) module may use at least one ECC or error detection code, such as, Reed-Solomon (RS) code, cyclic redundancy check (CRC) code.

In a RAID structure, when a disk fails, the data on each stripe may be rebuilt by using the hardware to check the ECC/parity distributed in each disk, and other disks may rebuild the data stored in the failed disk by checking the distributed ECC/parity. RAID5 is one of the RAID technologies. At least three disks are used for configuring the RAID5. FIG. 1 shows a schematic view of a configuration of a RAID5 system. As shown in FIG. 1, a RAID5 system stores all the ECCs in each disk in a stripe manner. Each disk stores different data in different pages, and each disk also stores a corresponding ECC. Each stripe includes data from N−1 different disks and an ECC from a remaining disk, where N is the stripe size, i.e., the number of the disks in a stripe. In the present example, N=4. When a disk fails, other disks may rebuild the data stored in the failed disk by an ECC checking. In RAID5, because all the ECCs need to use the capacity of one disk for checking, the actual disk capacity for use is N−1.

In a stripe, when distributing the data to each disk of the array, the stripe is defined as a full stripe when the stripe has the capacity of the maximum allowed data storage capacity. In other words, a full stripe is a stripe formed by using the largest allowed number of disks. Therefore, the full stripe has a high write performance, i.e., a fast speed. Another type of stripe is a partially filled stripe which has a smaller capacity than the stripe size. When the partially filled stripe is often randomly accessed, the write performance is low, as shown in FIG. 2. When receiving an I/O command, data 1 and an ECC are read from a disk to a memory, such as, a random access memory (RAM). As shown in FIG. 2, the partially filled stripe must compute a new ECC and write the data 1 to the same location in the disk. When the RAM has no sufficient space and is randomly accessed frequently, the write workload is increased and the write performance is lowered.

FIG. 3 shows a technique of memory backup in a RAID system. This technique provides a volatile memory 324 and a non-volatile memory 358 to the RAID system. The RAID system uses a RAID controller 312 to detect the failure of a main power supply. When the RAID controller 312 detects the failure of the main power supply, a temporary power supply 354 supplies a temporary power to the volatile memory 324 so that the RAID controller 312 may transfer the data from the volatile memory 324 to the non-volatile memory 358. In other words, the technique provides the volatile memory and the additional power supply for data backup in RAID system.

In the above data protection techniques, when processing data in the partially filled stripe, one of possible challenges is how to ensure saving the stripe data and successfully rebuild the stripe data, and how to ensure the uniform distribution of the data and the ECC/parity to each disk. Hence, designing a technique for data storing and rebuilding under the stripe architecture is one of important issues.

SUMMARY

The exemplary embodiments of the disclosure may provide a method and system for storing and rebuilding data.

One exemplary embodiment relates to a method for storing and rebuilding data, adapted to a disk storage system. The method may comprise: after receiving an Input/Output command, computing a corresponding parity; determining, based on the parity, whether a final stripe corresponding to the Input/Output command being a full stripe; when the final stripe being a full stripe, storing a plurality of data and the parity corresponding to the Input/Output command to a main hyper erase unit (HEU) in the disk storage system; and when the final stripe being not a full stripe, re-computing a final parity and writing repeatedly the final parity into at least two parity pages in a buffering HEU.

Another exemplary embodiment relates to a method for storing and rebuilding data, adapted to a disk storage system. The method may comprise: after receiving an Input/Output command, using a plurality of accumulated pages to compute a parity; determining, based on the parity, whether a stripe being full; when the stripe being full, storing the parity and data of each of the plurality of pages in a designated stripe, wherein the parity is used to identify an ending of a stripe; and when the stripe being not full, storing the parity; and when there being at least one Input/Output command, returning to the step of after receiving an Input/Output command, using a plurality of accumulated pages to compute a parity.

Yet another embodiment relates to a system for storing and rebuilding data. The system may comprise: a processor, based on a parity, to determine whether a final stripe corresponding to an Input/Output command is a full stripe; a main hyper erase unit (HEU) configured in a disk storage system, to store a plurality of data and the parity corresponding to the Input/Output command when the final stripe is a full stripe; and a buffering HEU configured in the disk storage system, and the processor re-computes a final parity and writes repeatedly the final parity into at least two parity pages in the buffering HEU when the final stripe is not a full stripe; wherein the processor further performs rebuilding a plurality of data of at least one failed disk in the disk storage system.

Yet another embodiment relates to a system for storing and rebuilding data, The system may comprise: a processor, based on an Input/Output command, to compute a parity and determine whether a stripe is full by using a plurality of accumulated pages; a main hyper erase unit (HEU) configured in a disk storage system, to store the parity and data of each of the plurality of accumulated pages into a designated stripe, wherein the parity is used to identify an ending of a stripe; and a metadata area configured in an HEU of the disk storage system, to store a logical page number and a parity information corresponding to each of the plurality of pages; wherein the processor further performs rebuilding a plurality of data of at least one failed disk of the disk storage system.

DETAILED DESCRIPTION OF DISCLOSED EMBODIMENTS

Figure 1:
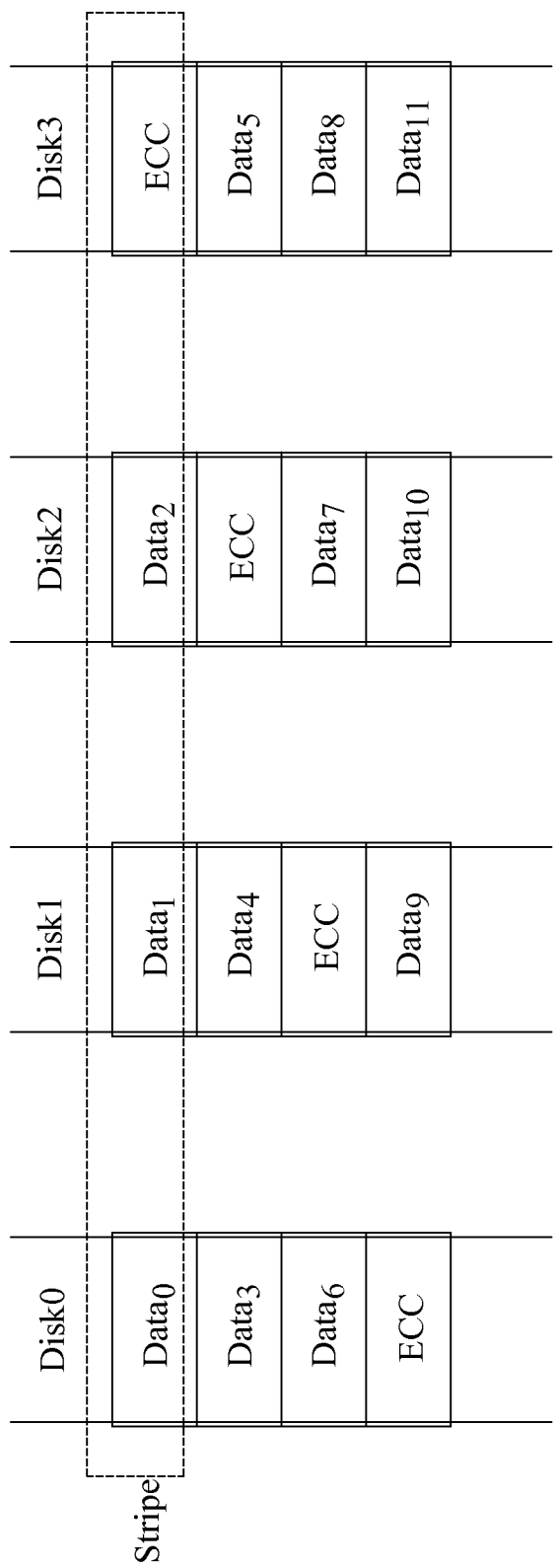
FIG. 1 shows a schematic view of a configuration of a RAID5 system.
Figure 2:
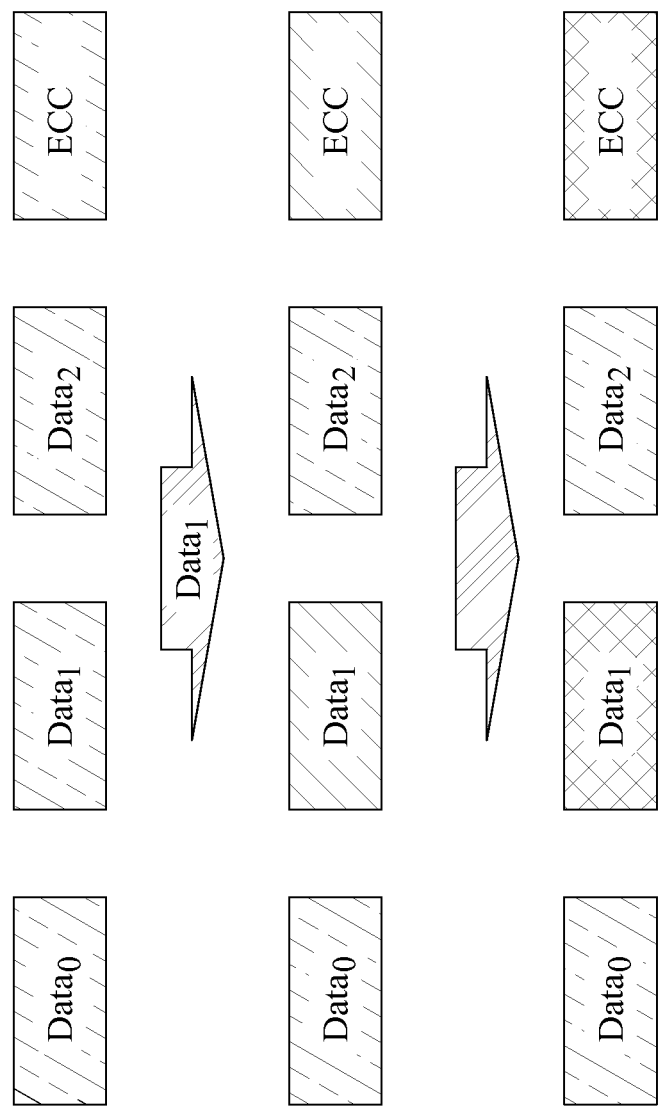
FIG. 2 shows a schematic view of the random access operation of a partial stripe.
Figure 3:
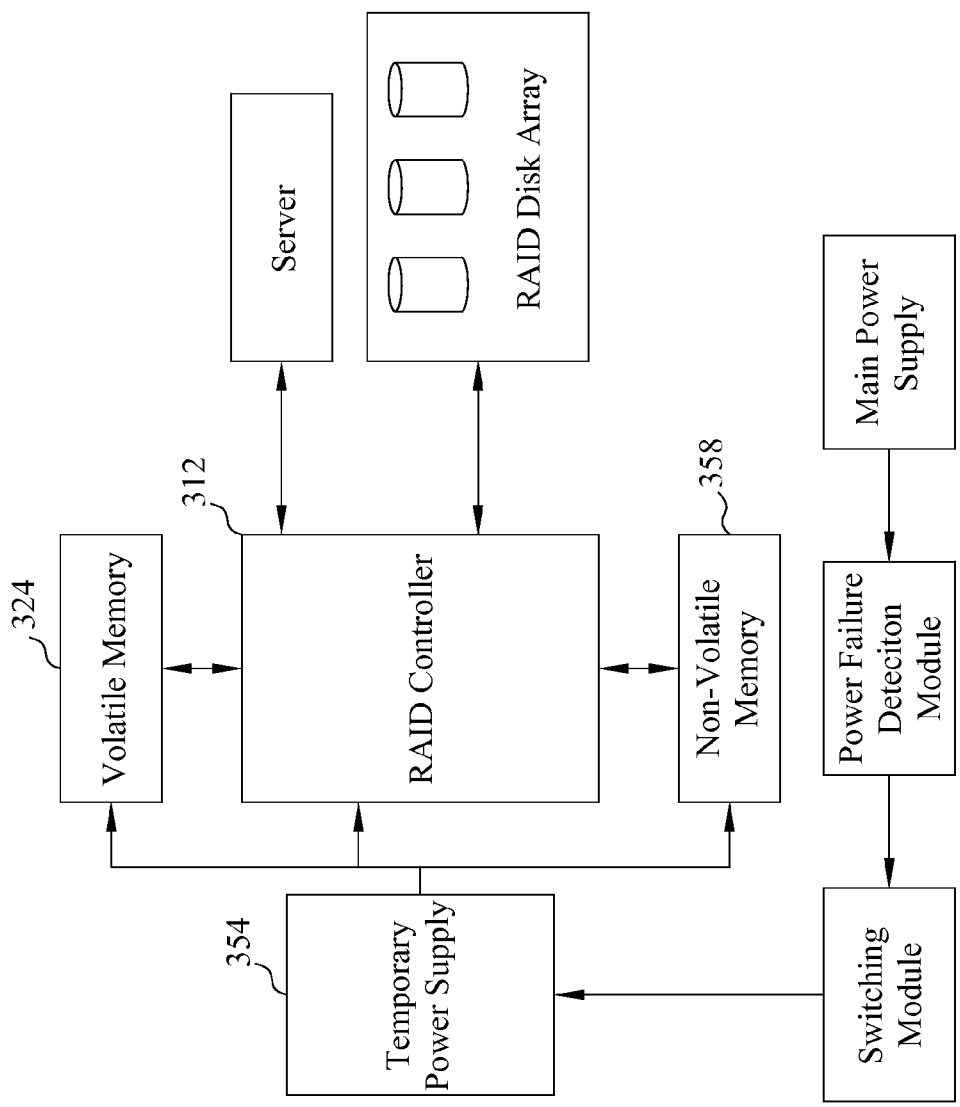
FIG. 3 shows a schematic view illustrating a memory backup technique in a RAID system.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The technique of data storing and rebuilding in the exemplary embodiments of the present disclosure establishes a translation layer so that one or more logical page numbers (LPNs) for an Input/Output command may be translated into one or more physical page numbers (PPNs) to manage all the access addresses in one or more storage devices, and uses a stripe as a unit for protecting and rebuilding data. The exemplary embodiments use a new technique to record the LPN parity of the stripe and the parity thereof and adopt the log and the metadata to record the rebuilding information. Before establishing the translation layer, the exemplary embodiments of the present disclosure describe the storing format of a data storage unit (referred to a page) of each disk and the storing format of a super erase unit (SEU), respectively.

Figure 4:
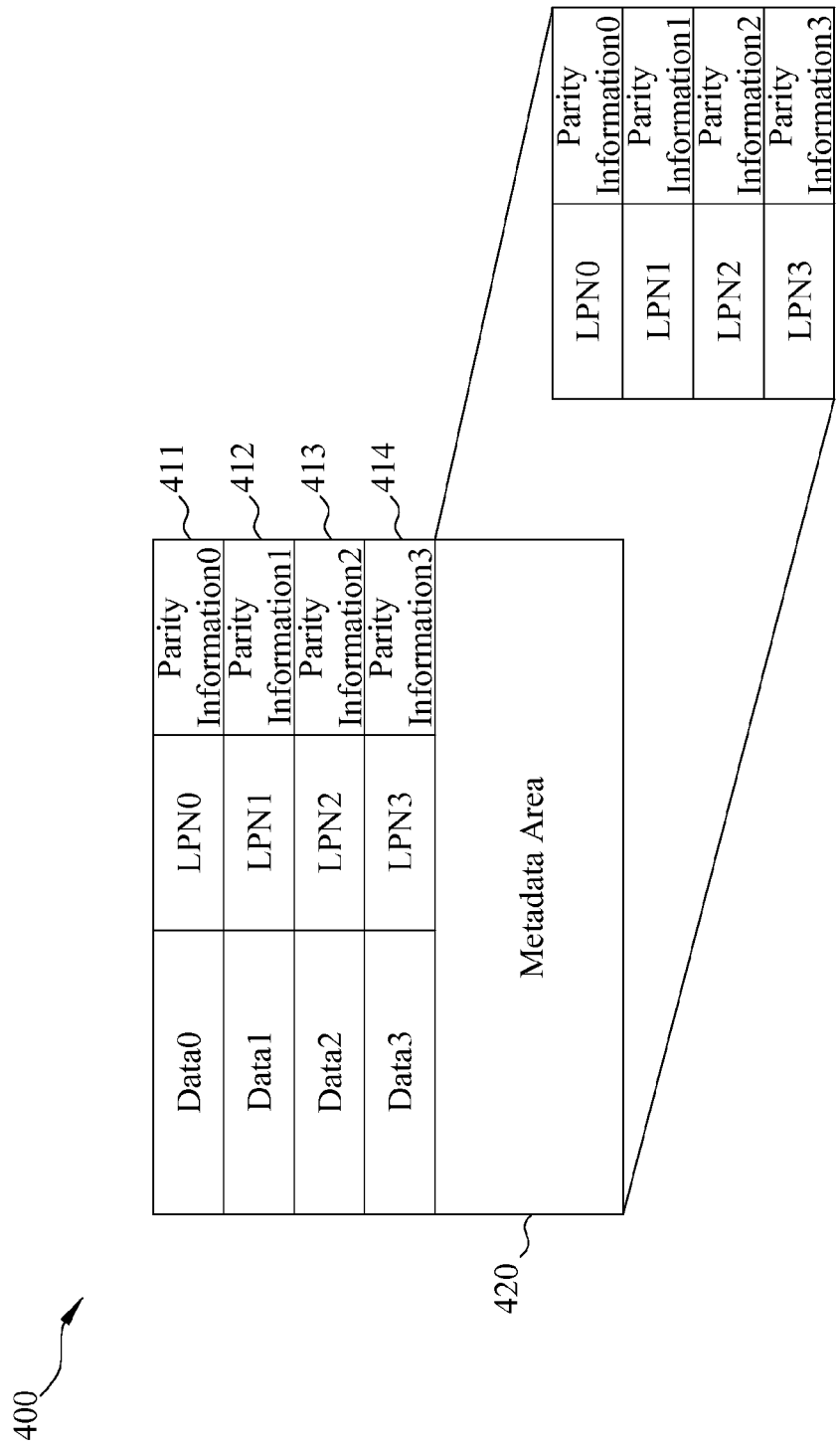
FIG. 4 shows a schematic view of a storing format of a super erase unit (SEU), according to an exemplary embodiment.

In the present disclosure, each page is divided into two parts. One part is the data area and the other part is the spare area. Each SEU includes a plurality of pages and an ending. The ending is a metadata area. The metadata area records the LPNs of the plurality of pages and the parity information (PI) corresponding to each page in an SEU. In other words, the information of the spare areas in the plurality of pages is collected in the metadata area. FIG. 4 describes a storing format of an SEU according to an embodiment of the present disclosure. In the exemplar of FIG. 4, an SEU includes four pages and a metadata area. For easy illustration, an SEU 400 includes four pages (page 411~page 414) and a metadata area 420, wherein each page includes a data area and a spare area; for example, page 411 includes a data area (containing data 0) and a spare area (recording an LPN of page 411, i.e., LPN0, and parity information P10). In other words, page 411 includes data0, LPN0 and P10, and so on for other pages. Metadata area 420 includes each of LPNs corresponding to each of pages 411-414 (i.e., LPN0-LPN3) and parity information (i.e., P10-P13). When parity information is written to the metadata area 420, the parity information may be, but not limited to, a flag for determining whether the data or the parity is written into.

Figure 5:
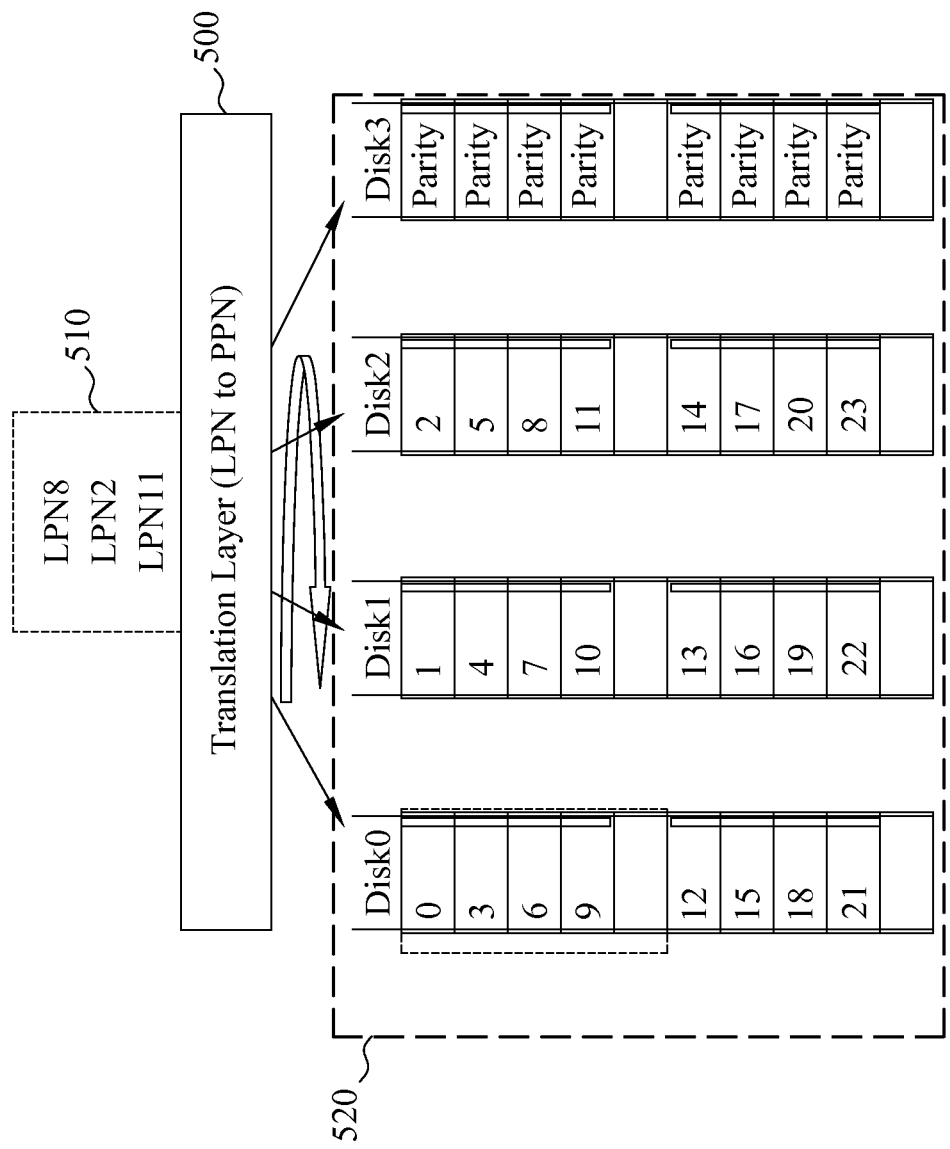
FIG. 5 shows a schematic view illustrating a translation layer that translates an Input/Output command into physical page number(s), according to an exemplary embodiment.

FIG. 5 shows a schematic view illustrating a translation layer that translates an Input/Output command into physical page number(s), according to an exemplary embodiment. In the exemplar of FIG. 5, a translation layer 500 receives an Input/Output command, such as a command queue 510, and translates the command queue 510 from access logical location(s), such as LPN11, LPN2, and LPN8, into access locations in a plurality of disks, labeled in the present exemplar as PPNs, such as pages 3, 9, 12, 18 of disk 0, pages 4, 10, 13, 19 of disk 1, and pages 5, 11, 14, 20 of disk 2.

It may be seen from the exemplar of FIG. 5, the accessed logical locations of the command queue 510 are translated to access locations of N disks (N equals to 4 in the exemplar), and these access locations of N disk are evenly distributed to N-1 disks. In other words, the data on each of the four stripes is distributed to three different disks (disks 0-2) and the ending of each stripe stores own parity information and is stored in another disk (disk 3). For example, the data on stripe 3 (pages 9-11) is distributed to three different disks (disks 0-2), and the ending of stripe 3 stores a parity information and is stored in disk 3. Therefore, each stripe uses three (i.e., N-1, and N=4) data pages, and the ending of each stripe uses a parity page to store a parity information.

Accordingly, based on an exemplary embodiment of the present disclosure, a hyper erase unit (HEU) is defined to be formed by a plurality of SEUs, each of a plurality of full stripes formed by the plurality of SEUs is ensured to distribute across N-1 different disks, and the ending of each full stripe stores a parity information to identify the ending of a full stripe, wherein N is the number of disks used by the HEU. In the exemplar of FIG. 5, HEU 520 may be formed by eight SEUs. The data stored in each of a plurality of full stripes formed by the eight SEUs is distributed across disks 0-2, and the parity information of the ending of each full stripe is stored in disk 3.

Therefore, by using a specific distribution order, such as round-robin, the exemplary embodiment of the present disclosure may evenly distribute an Input/Output command from the accessed logical locations to a plurality of disks. In addition, these stripes may be filled into an HEU. Selecting a plurality of SEUs to form an HEU also satisfies the wear leveling principle of disks. The wear leveling principle is to even the wearing condition of each block. The following describes how the exemplary embodiments of the present disclosure process the data of partially filled stripe(s) when receiving an Input/Output command Based on the stripe size, the processing is divided into two cases. One is a fixed stripe size, and the other is a dynamic stripe size.

Figure 6:
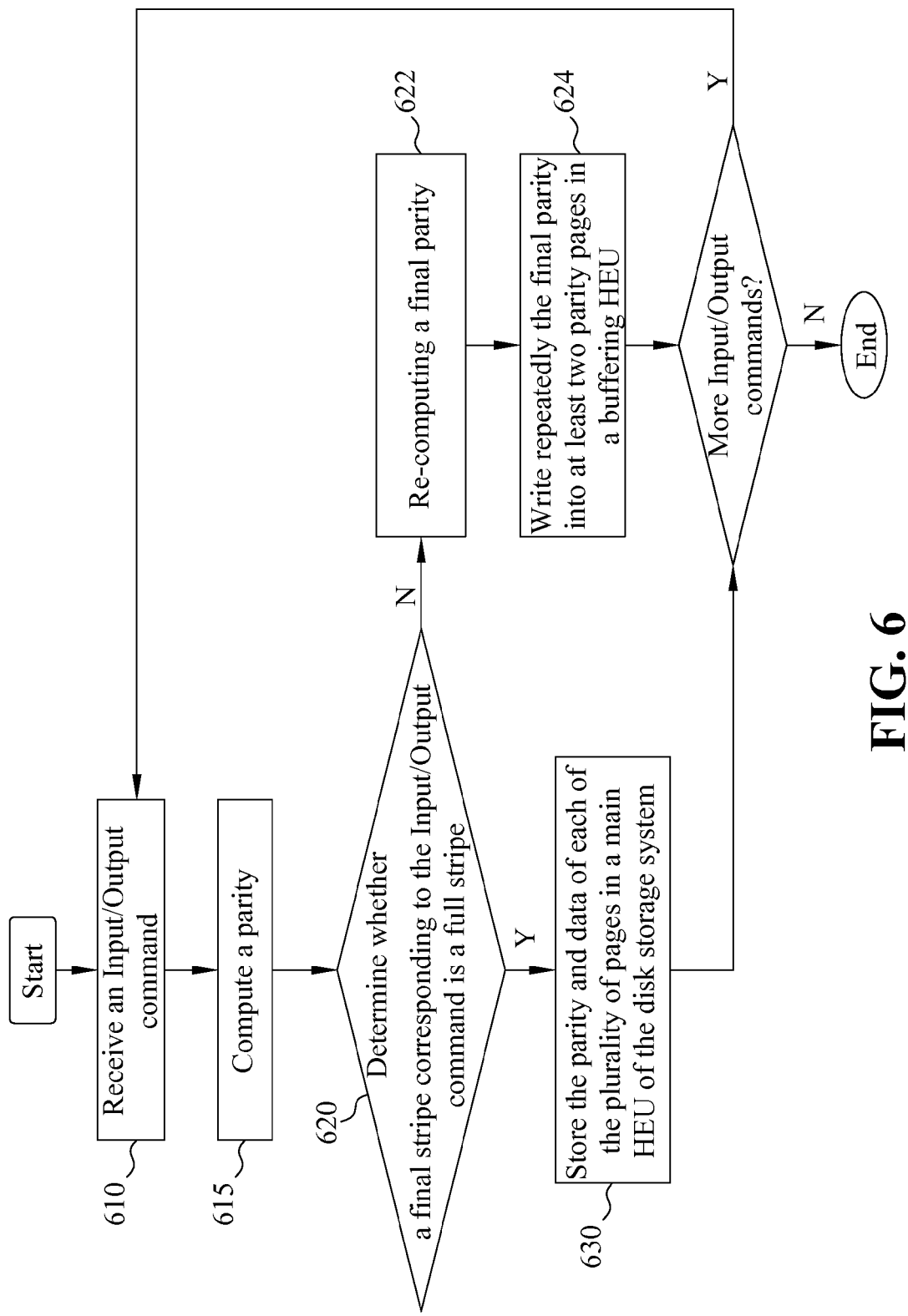
FIG. 6 shows a flowchart of a method for storing and rebuilding data in the case of a fixed stripe size, according to an exemplary embodiment.

In the case of fixed stripe size, FIG. 6 shows a flowchart of a method for storing and rebuilding data, according to an exemplary embodiment. The method may be adapted to a disk storage system. Referring to FIG. 6, after an Input/Output command is received (step 610), a plurality of accumulated pages are used to compute a parity corresponding to the I/O command (step 615). Based on the parity, the method may determine whether a final stripe corresponding to the Input/Output command is a full stripe (step 620). When the final stripe is a full stripe (step 620, Yes), the parity and data of each of the plurality of pages are stored in a main HEU of the disk storage system (step 630). When the last stripe is not a full stripe (step 620, No), the method may, based on old data and newly received data, re-computes a final parity (step 622) and writes repeatedly the final parity into at least two parity pages in a buffering HEU (step 624). When there is no more Input/Output command, the method terminates the flow; and when there is at least one Input/Output command, the method returns to step 610.

In step 624, writing repeatedly the final parity into at least two parity pages in the HEU may be realized in many manners. For example, but not limited to, the final parity may be repeatedly written into continuous pages in the HEU, or writing repeatedly the final parity into at least two parity pages in a way of physical mapping, such as by logic gate(s). As such, the at least two parity pages may avoid being stored in the same disk. In step 630, the parity indicates whether the final stripe is a full stripe. The disk storage system may be, but not limited to, a RAID system.

In the data storing method of FIG. 6, the method may further include selecting the buffering HEU from a plurality of SEU candidates. The SEU candidates are the recycled and used SEUs on a condition that each erase unit (EU) on the SEUs is reassigned to an EU on other SEU so that the EUs on these SEUs are invalid. These recycled SEUs are the SEU candidates. The criterion for selecting the SEU candidates to from a HEU is that these SEU candidates are from different disks. There are many ways to select SEU candidates. For example, the first selection method is to place the recycled SEU candidates into a queue of each disk sequentially, and then select a SEU candidate from each queue of different disks by following the FIFO order. The second selection method is to tally the times of being used for each SEU, and select those SEUs having the less number of times used.

Figures 7A, 7B:
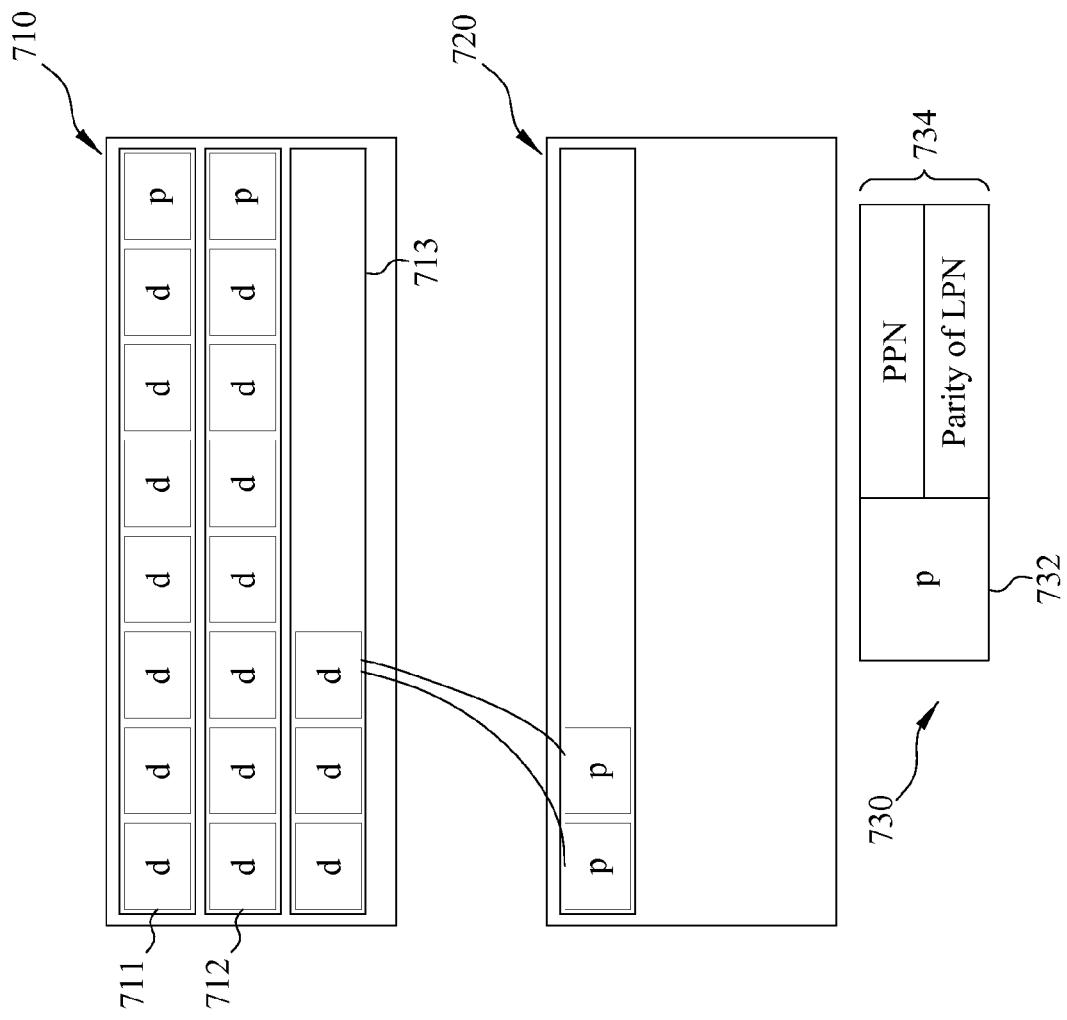
FIG. 7A shows a schematic view of a storing format of page(s) in a main HEU of the FIG. 6, according to an exemplary embodiment.
FIG. 7B shows a schematic view of a storing format of parity page(s) in a buffering HEU of FIG. 6, according to an exemplary embodiment.

As aforementioned, in the present disclosure, each page is divided into a data area and a spare area. Accordingly, FIG. 7A shows a schematic view of a storing format of page(s) in a main HEU of the FIG. 6, according to an exemplary embodiment, and FIG. 7B shows a schematic view of a storing format of parity page(s) in a buffering HEU of FIG. 6, according to an exemplary embodiment. In the exemplar of FIG. 7A, a main HEU 710 includes two types of pages. One is the data page, indicated as d; and the other is a parity page, indicated as P. In FIG. 7A, the data area of each data page in main HEU stores data, and the spare area of the data page stores a LPN. In FIG. 7A, the data area of the parity page (i.e. the case of full stripe) in the main HEU stores the parity of the data, and the spare area stores the parity of LPNs to rebuild LPN information. The Main HEU 710 has three stripes, wherein two are full stripes 711, 712 and the last one is partial stripe 713.

In FIG. 7B, data area 732 of a parity page 730 of a buffering HEU 720 is for storing the parity p of the data in partial stripe 713 of main HEU 710; spare area 734 stores two pieces of information. The first piece of information is the parity of LPN for rebuilding the LPN information, and the other piece of information is physical page number (PPN). With the continuous writing characteristics of physical locations, the numbering of each location may continue to grow. Therefore, the PPN may be used to determine which page is a newer parity page. When the parity is written, the LPN parity and the PPN will also be written. As such, the stripe in the buffering HEU 720 may be found.

Figure 8:
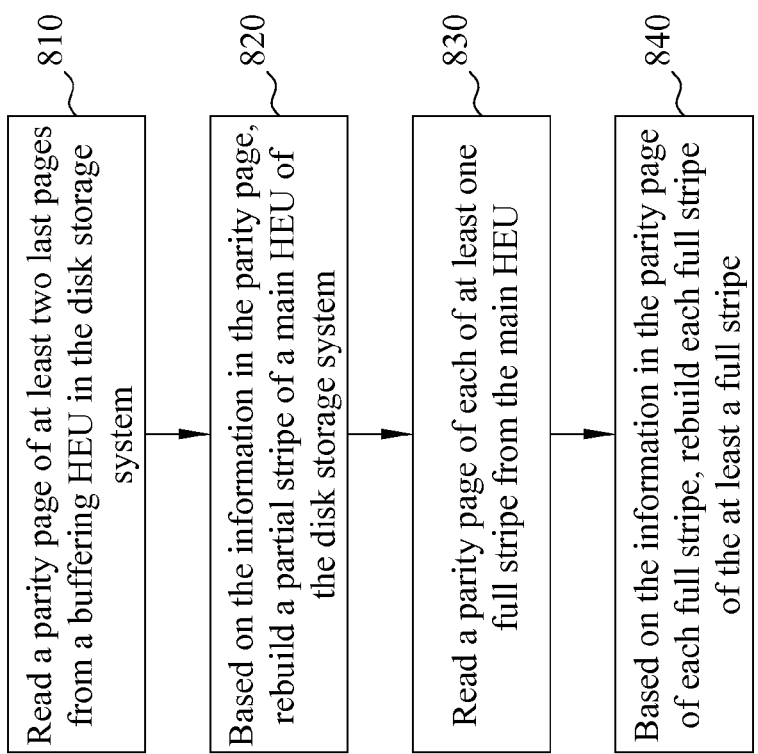
FIG. 8 shows a flowchart of a method for rebuilding data, according to an exemplary embodiment.

Accordingly, in the case of fixed size stripe, FIG. 8 shows a flowchart of a method for rebuilding data, according to an exemplary embodiment. The method may be adapted to a disk storage system. Referring to FIG. 8, the method starts with reading a parity page of at least two last pages from a buffering HEU in the disk storage system (step 810), and based on the information in the parity page, rebuilds a partial stripe of a main HEU of the disk storage system (step 820). Then, the method reads a parity page of each of at least one full stripe from the main HEU (step 830), and based on the information in the parity page of each full stripe, rebuilds each full stripe of the at least one full stripe (step 840). The storing formats of the partial stripe and the full stripe are described as the storage format of the main HEU in FIG. 7A, and will not be repeated here. The storing format of a parity page in the buffering HEU is described as the storing format of the parity page in FIG. 7B, and will not be repeated here.

In the case of dynamic stripe size, the data storing technique according to one embodiment of the present disclosure is to define the parity information to determine whether each page in an HEU stores data or parity (flag), and define a parity distance (PD) is the interval between two consecutive parity pages. When a page in an HEU stores data, the data area of the page is to store data and the spare area is to store LPN and PI (the value of PI is set to 0). The parity page is the ending of a stripe. When a page in an HEU stores parity, the data area of the page is to store the parity of data in the stripe, and the spare area is to store the parity of LPNs and PI (the value of PI is set to 1). PI may be realized with a 1-bit flag.

Figure 9:
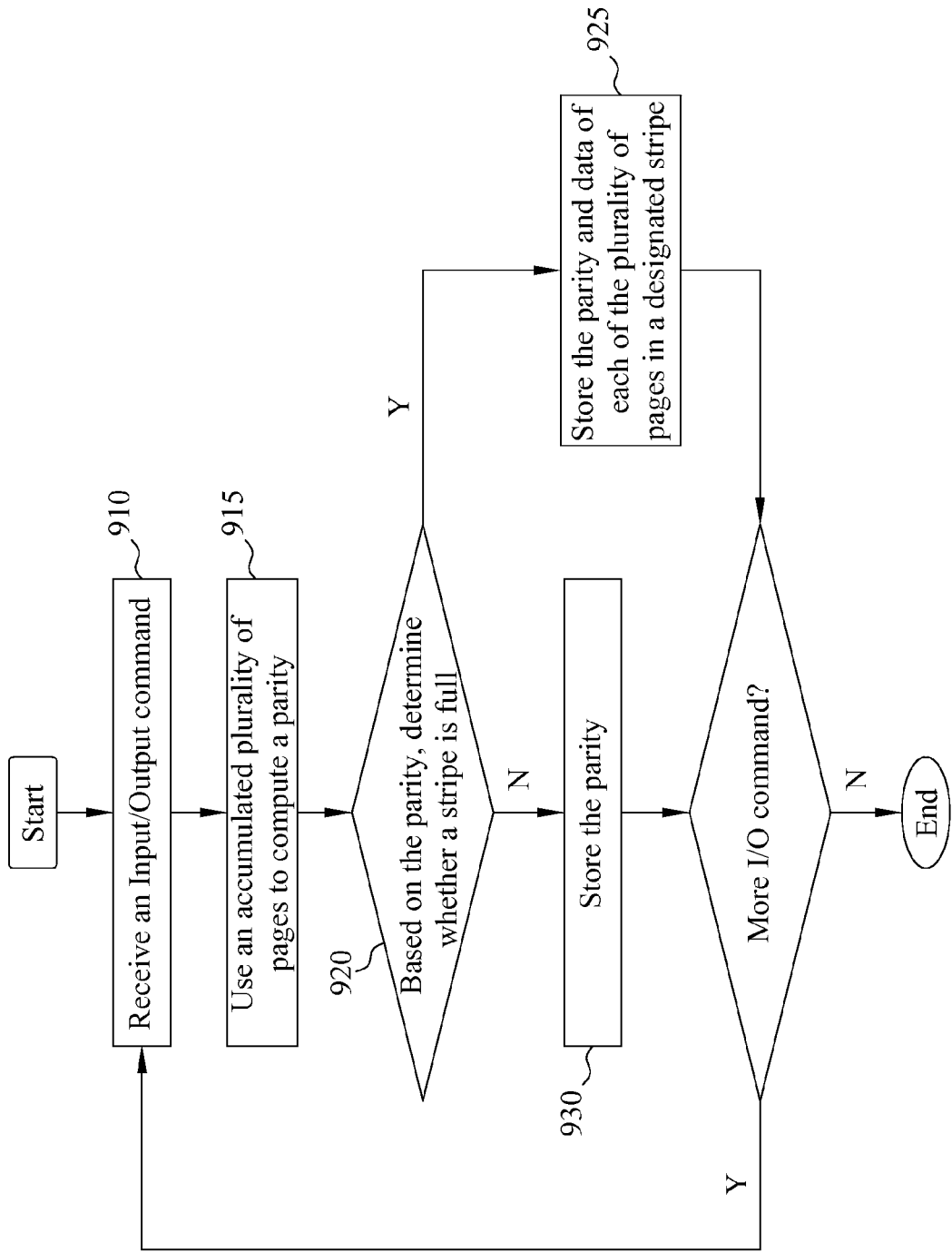
FIG. 9 shows a flowchart of a method for storing data in the case of variable stripe sizes, according to an exemplary embodiment.

In the case of dynamic stripe size, the storing technique of another embodiment of the present disclosure is to define the storing format of a SEU as shown in FIG. 4, and access data or parity with the assistance of the aforementioned metadata area of SEU because the information in the spare areas of a plurality of pages of the SEU is all gathered in the metadata area. For example, the metadata area is used to store information required for rebuilding, such as LPN, valid pages, and so on. FIG. 9 shows a flowchart of a method for storing data in the case of variable stripe sizes, according to an exemplary embodiment. The method may be adapted to a disk storage system. Referring to FIG. 9, after an Input/Output command (step 910) is received, a plurality of accumulated pages are used to compute a parity (step 915). Based on the parity, the method determines whether a stripe is full (step 920). When the stripe is full (step 920, Yes), the parity and data of each of the plurality of accumulated pages are stored in a designated stripe (step 925). When the stripe is not full (step 920, No), the parity is stored (step 930). When there is at least one Input/Output command, the method returns to the step 910. When there is no more I/O command, the flow is terminated. Wherein the parity is used to identify an ending of a stripe, and the spare area of each of the plurality of pages stores a flag to indicate the page stores the parity or the data.

Figure 10:
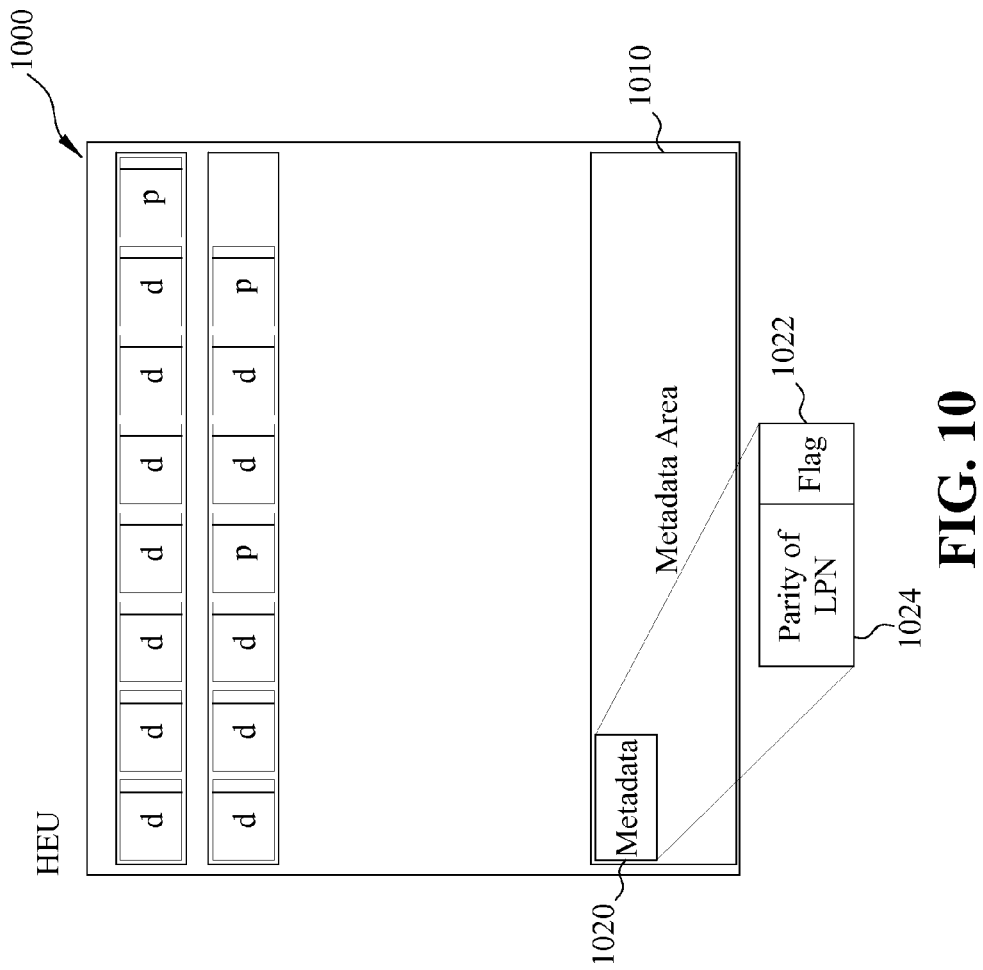
FIG. 10 shows a method for storing and rebuilding data, according to another exemplary embodiment.

FIG. 10 shows a method for storing and rebuilding data, according to another exemplary embodiment. As shown in FIG. 10, the method may use a metadata area 1010 to store an LPN and a parity information corresponding to each of a plurality of pages. As aforementioned, an HEU 1000 is formed by a plurality of selected SEUs. After the plurality of pages are written into each SEU, there is a metadata 1020 that will be used as the ending of the SEU. Therefore, the HEU 1000 has a corresponding metadata area 1010. Metadata 1020 is recorded in the same SEU, with the LPN of the plurality of pages and a corresponding PI of each page. In other words, metadata 1020 gathers the information of the spare areas of the plurality of pages of the same SEU. The parity information may be a flag. Therefore, the data storing method stores the data (indicated by d) into a page of a stripe when it receives the data, until an Input/Output queue is full. Based on a plurality of pages of the stripe, the method computes a parity (indicated by P), and writes the parity of the LPNs of the plurality of pages of the stripe (labeled as 1024) and the parity information (such as a flag 1022) of the stripe into a metadata area until the processing reaches the end of all received data.

In the case of variable stripe size, the truncation of a full stripe may be divided into two cases. The first case is truncating a full stripe depends on the status of a current Input/Output command. When an Input/Output command is already received and the receiver is in an idle state, it indicates the data in an Input/Output queue based on the Input/Output command are all transmitted. At this point, a parity P may be used as an ending to a partial stripe and the partial stripe is constructed. In other words, in this case, the stripe size is not fixed, but related to the status of the current Input/Output command. Hence, the stripe size is dynamic. The other case is that, for example, when the number of accumulated data pages is greater than or equal to N−1 (N is the number of disks) and a parity is computed from N−1 previously accumulated data pages, a configured full stripe will store the N−1 data pages and the parity according to the disclosed exemplary embodiments. In other words, truncating a full stripe depends on the number N of disks in a plurality of disks of a disk storage system. As aforementioned, a parity stored in a parity page is used to identify the ending of a stripe.

Figure 11:
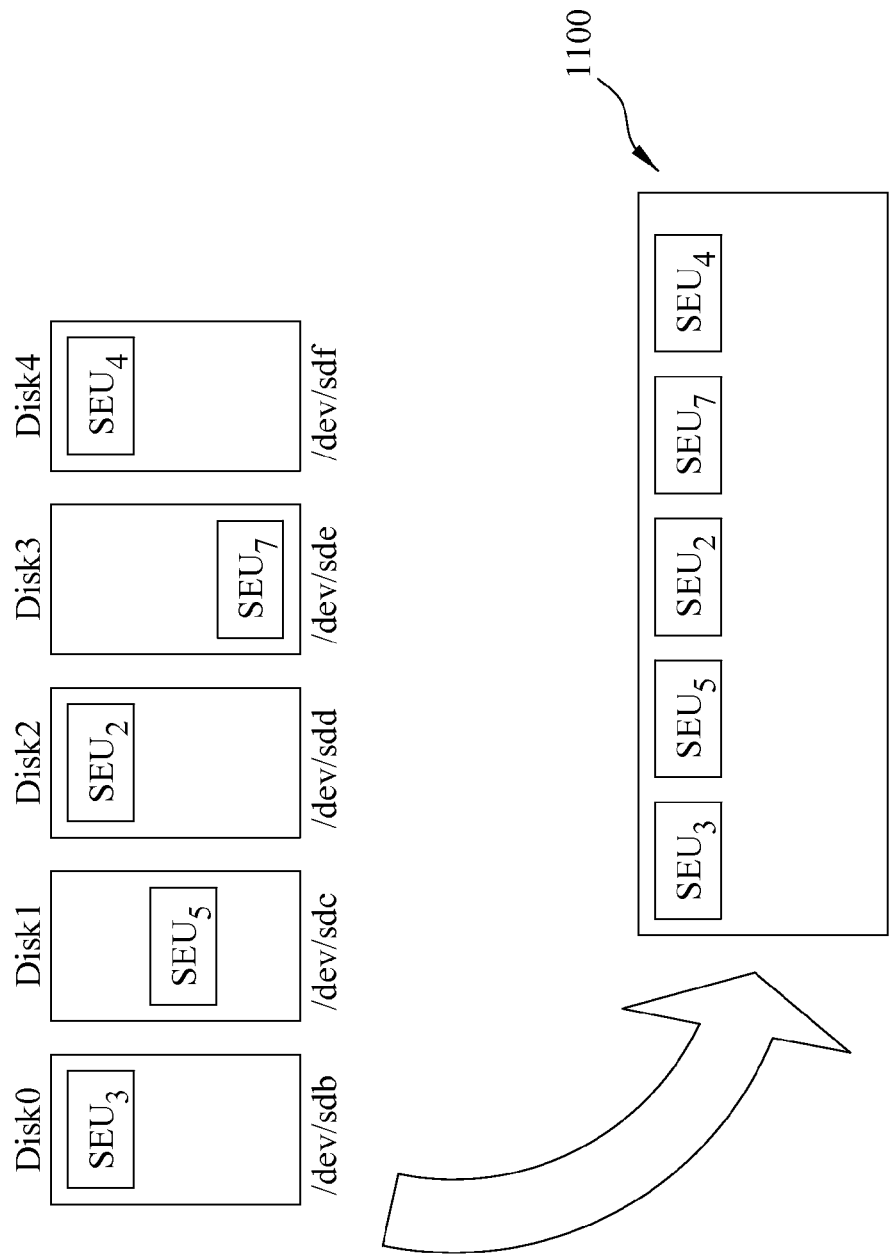
FIG. 11 shows a method illustrating the selection of recycled SEUs by an HEU, according to an exemplary embodiment.

The disclosed exemplary embodiments not only refrains from writing old data into the physical address, but also avoids writing data into bad block of the disk. According to an exemplary embodiment shown in FIG. 11, when forming a new HEU 1100, the SEUs selected from a plurality of recycled SEUs will not be limited to a same stripe. For example, in the new HEU 1100, the SEUs selected from a plurality of recycled SEUs are $SEU_3$ of disk 0, $SEU_5$ of disk 1, $SEU_2$ of disk 2, $SEU_7$ of disk 3 and $SEU_4$ of disk 4, wherein the physical addresses of $SEU_3$ and $SEU_5$ are not addresses of two consecutive adjacent blocks. As such, the data can be avoided to be written into bad blocks in the disk.

Figure 12A:
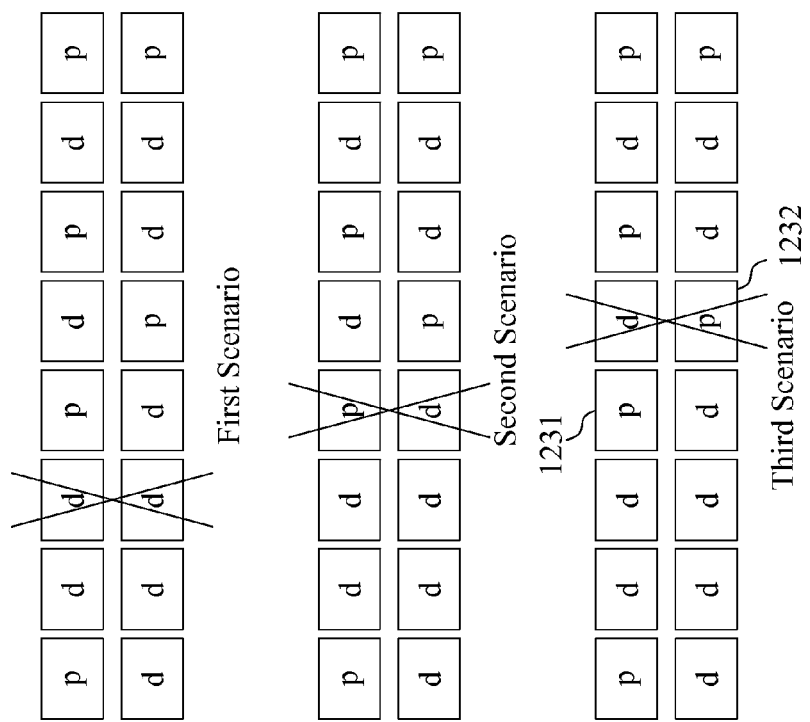
FIG. 12A shows a plurality of scenarios of broken disks, according to an exemplary embodiment.
Figure 12B:
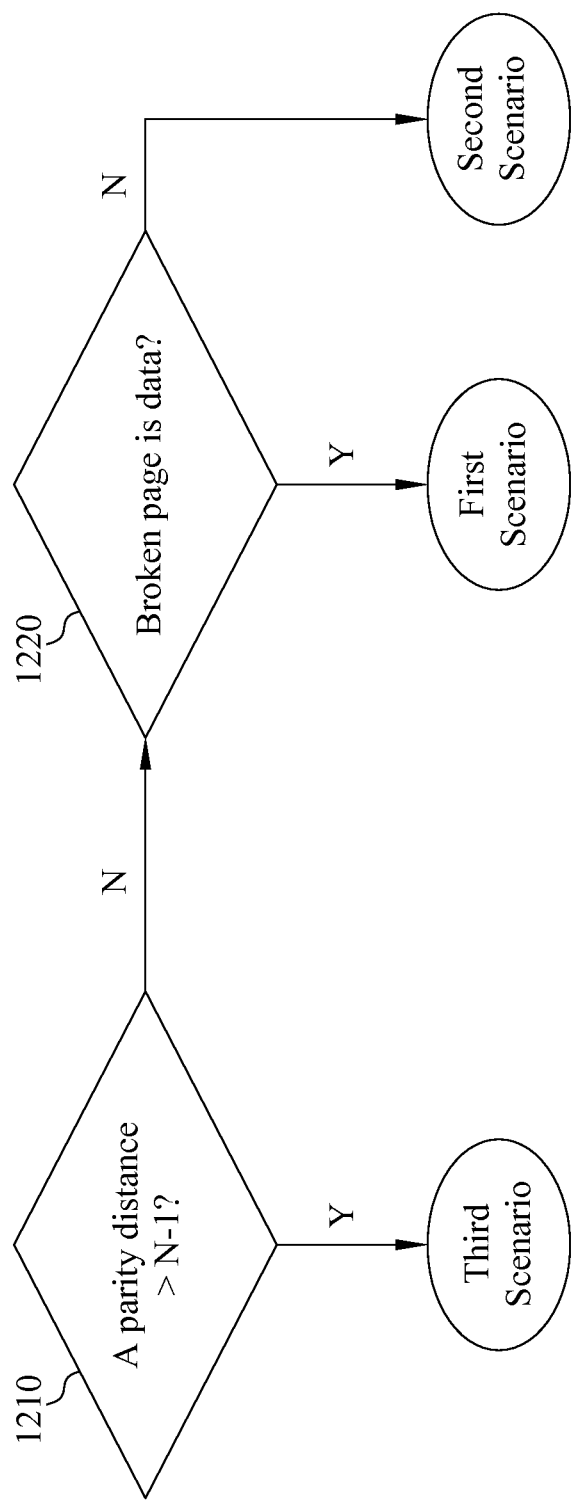
FIG. 12B shows a scheme of identifying the disk-failed scenarios in FIG. 12A, according to another exemplary embodiment.

There are different ways of disk failures and rebuilding damaged pages in the disk. FIG. 12A shows several scenarios of disk failures. The first scenario is that the data page broken occurs in the disk, the second scenario is that the parity page broken occurs in the disk; and the third scenario is that the page broken occurs in the disk, with two nearby parity pages on different stripes, as the distance between parity page 1231 and parity page 1232 is greater than N−1. As aforementioned, based on the parity information, such as flag, stored in the metadata area, the disclosed exemplary embodiments may determine the type of a failed page is data or parity. Based on the parity distance, the third scenario may be determined. FIG. 12B shows a scheme of identifying the disk-failed scenarios in FIG. 12A, according to another exemplary embodiment. As shown in FIG. 12B, when the parity distance is larger than N−1 (step 1210, Yes), the third scenario is identified. When the parity distance is less than N−1 (step 1210, No), the broken page is determined to be either data or not (step 1220). When the broken page is data (step 1220, Yes), the first scenario is identified. When the broken page is not data (step 1220, No), the second scenario is identified.

Figure 13:
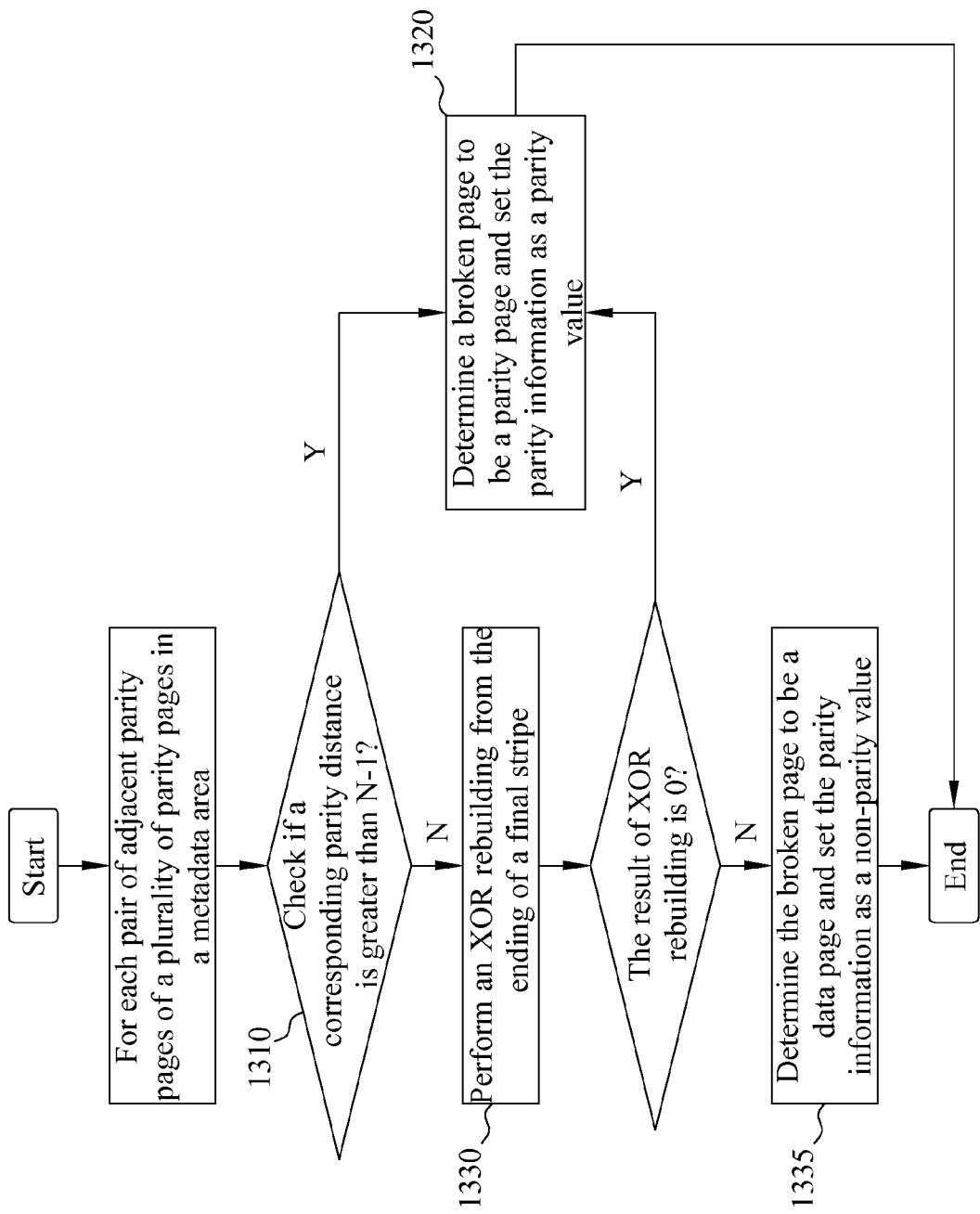
FIG. 13 shows a flowchart of a method for rebuilding data in the case of variable stripe sizes, according to an exemplary embodiment.

Accordingly, FIG. 13 shows a flowchart of a method for rebuilding data in the case of variable stripe sizes, according to an exemplary embodiment. The method may be adapted to a disk storage system. The method 1300 checks whether a parity distance corresponding to each pair of adjacent parity pages of a plurality of parity pages in a metadata area is greater than N−1 (step 1310). When the parity distance is greater than N−1 (step 1310, Yes), the third scenario is identified. Then, a broken page is determined to be a parity page and the parity information is set as a parity value (step 1320). The parity value may be, but not limited to, 1. When the parity distance is less than or equal to N−1 (step 1310, No), an XOR rebuilding is performed from the ending of a final stripe (step 1330). When the result of the XOR rebuilding is 0, the second scenario is identified and step 1320 is executed. When the result of the XOR rebuilding is not 0, the first scenario is identified. Then, the broken page is determined to be a data page and the parity information is set as a non-parity value (step 1335). The non-parity value may be, but not limited to, 0. As such, the data rebuilding method not only computes the correct data, but also labels the correct parity information. As aforementioned, the parity information may be realized with a 1-bit flag.

According to the exemplary embodiments of the present disclosure, an XOR rebuilding is defined as: performing a reverse operation when the step of the XOR operation already computes a corresponding parity for a stripe, while a general XOR operation is to perform bitwise exclusion of two values. For example, when data 1 (value=1) XOR data 2 (value=0), the parity (value=1) is obtained. When the parity and the data 1 perform an XOR rebuilding, data 1 (value=1) is obtained. When the parity and the data 2 perform an XOR rebuilding, data 2 (value=0) is obtained. When performing an XOR rebuilding on data of an entire stripe with the parity, taking the above as an example, when performing 1 XOR 0 XOR 1, a value 0 is obtained.

Before performs step 1310, method 1300 may scan a metadata area of an HEU to determine a plurality of the parity pages in the metadata area and compute each parity distance corresponding to each pair of parity pages of the plurality of parity pages, and then executes the operations in FIG. 13 until all the broken pages in the HEU are rebuilt. Accordingly, when the broken page is data (the first scenario), the broken data page may be rebuilt by the parity of the ending of a stripe. When the broken page is as the second scenario, the parity of the previous stripe may be used to rebuild the previous stripe and the rebuilt data of the previous stripe may be used to rebuild the parity for the previous strip. When the broken page is as the third scenario, because the broken page is between the other two parity pages and also stores parity, the parity page in the middle may be rebuilt by using at least one previous data page in the same stripe.

Accordingly, according to one exemplary embodiment of present disclosure, a system for storing and rebuilding data of the may comprise a processor, a main HEU configured in a disk storage system, and a buffering HEU configured in the disk storage system. The processor determines, based on a parity, whether a final stripe corresponding to an Input/Output command is a full stripe. The main HEU stores a plurality of data and a parity corresponding to the Input/Output command when the final stripe is a full stripe. When the final stripe being not a full stripe, the processor re-computes a final parity and writes repeatedly the final parity into at least two parity pages of the buffering HEU.

The processor may further perform the rebuilding of a plurality of data of at least one failed disk in the disk storage system. The rebuilding may include reading a parity page of the last at least two parity pages from the buffering HEU; based on the information of the parity page of the at least two parity pages, rebuilding a partial stripe of the main HEU of the disk storage system; reading a parity page of each full stripe of at least one stripe from the main HEU; and based on the information of the parity page of each full stripe, rebuilding each full stripe of the at least one full stripe.

The storing format of the pages in the main HEU and the storing format of the parity pages in the buffering HEU are already described in FIG. 7A, FIG. 7B and other embodiments of the present disclosure, and will not be repeated here. The details of the data storing and rebuilding by the processor are already described as in previous embodiments, and will not be repeated here.

According to another embodiment of the present disclosure, a system for storing and rebuilding data may comprise a processor, a main hyper erase unit (HEU) configured in a disk storage system, and a metadata area configured in an HEU of the disk storage system. The processor uses a plurality of accumulated pages to compute a parity based on an Input/Output command, and determines whether a stripe is full based on the parity. The main hyper erase unit (HEU) stores the parity and data of each of the plurality of pages in a designated stripe, wherein the parity is used to identify an ending of a stripe. The metadata area stores a logical page number and a parity information corresponding to each of the plurality of pages. The processor further performs the rebuilding of a plurality of data of at least one failed disk of the disk storage system, as shown in FIG. 13, and the detailed description will not be repeated here. The storing format of the metadata area is as described in the previous embodiments of the present disclosure and will not be repeated here. In the present embodiment, the stripe size is variable, and as aforementioned, truncating a full stripe depends on the at least one status of the Input/Output command, or on the number of the disks in the disk storage system. The details will not be repeated here.

Accordingly, the data storing and rebuilding technique of the disclosed exemplary embodiments may be applied to, such as cloud storage systems (for example, RAID systems) with features of high speed access and data protection.

The exemplary embodiments of present disclosure provide a system and method for storing and rebuilding data after disk failure. The technique uses stripe as a data unit for protection and rebuilding. When the stripe size is fixed, the data in a partial stripe is used to re-compute a final parity, and the final parity is repeatedly written into at least two parity pages in a buffering HEU. When rebuilding data, the final parity is read from a parity page of the at least two parity pages from the buffering HEU to rebuild the partial stripe. When the stripe size is variable, the method uses a metadata area configured in an HEU for storing an LPN corresponding to each page of the plurality of pages, and a spare page of each page for storing a parity information to indicate whether the page is parity or data. When rebuilding data, by checking whether a parity distance corresponding to a pair of two adjacent parity pages in the metadata area is greater than or equal to the number of disks in a disk storage system, and uses a result of an XOR computation to rebuild the parity or data.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for storing and rebuilding data, adapted to a disk storage system, said method comprising:
   after receiving an Input/Output command, computing a corresponding parity;
   determining, based on the parity, whether a final stripe corresponding to the Input/Output command being a full stripe;
   when the final stripe being a full stripe, storing a plurality of data and the parity corresponding to the Input/Output command to a main hyper erase unit (HEU) in the disk storage system; and
   when the final stripe being not a full stripe, re-computing a final parity and writing repeatedly the final parity into at least two parity pages in a buffering HEU.

2. The method as claimed in claim 1, wherein said disk storage system is a redundancy array of independent disks.

3. The method as claimed in claim 1, wherein said at least two parity pages in said buffering HEU are consecutive parity pages.

4. The method as claimed in claim 1, wherein said method further includes:
   using a physical correspondence scheme to write repeatedly said final parity into said at least two parity pages in said buffering HEU.

5. The method as claimed in claim 1, wherein said buffering HEU is formed by a plurality of parity pages, with each parity page further including:
   a data area configured to store a parity of at least a data of a partial stripe in said main HEU; and
   a spare area configured to store a parity of a logical page number (LPN), and a physical page number (PPN).

6. The method as claimed in claim 1, wherein said main HEU is formed by a plurality of super erase units (SEUs), each full stripe of a plurality of full stripes formed by said plurality of SEUs is ensure to distribute across N−1 disks, and the each full stripe has an ending storing a parity information, where N is the number of disks used by said HEU.

7. The method as claimed in claim 6, wherein each SEU of said plurality of SEUs includes a plurality of pages and a metadata area, and said metadata area records an LPN and a parity information corresponding to each page of said plurality of pages.

8. The method as claimed in claim 1, wherein said method further includes:
   selecting said buffering HEU from a plurality of SEU candidates.

9. The method as claimed in claim 1, wherein said parity indicates whether said final stripe is a full stripe.

10. The method as claimed in claim 1, wherein said method further includes:
    reading one parity page of at least two final parity pages from said buffering HEU of said disk storage system;

based on an information of said one parity page of said at least two parity pages, rebuilding a partial stripe of said main HEU of said disk storage system;

reading a parity page of each full stripe of at least one full stripe of said main HEU; and based on an information of said parity page of each full stripe of at least one full stripe, rebuilding the each full stripe of said at least one full stripe.

11. A method for storing and rebuilding data, adapted to a disk storage system, said method comprising:
   after receiving an Input/Output command, using a plurality of accumulated pages to compute a parity;
   determining, based on the parity, whether a stripe being full;
   when the stripe being full, storing the parity and data of each of the plurality of pages in a designated stripe, wherein the parity is used to identify an ending of the stripe;
   when the stripe being not full, storing the parity; and
   when there being at least one Input/Output command, returning to the step of after receiving an Input/Output command, using a plurality of accumulated pages to compute a parity.

12. The method as claimed in claim 11, wherein a spare page of each page of said plurality of pages stores a flag to indicate said page stores a parity or a data.

13. The method as claimed in claim 11, wherein said method further comprises:
   using a metadata area of a hyper erase unit (HEU) of said disk storage system to store a logical page number (LPN) and a parity information corresponding to each page of said plurality of pages.

14. The method as claimed in claim 11, wherein said stripe has a variable size, and truncating a full stripe depends on at least one status of said Input/Output command.

15. The method as claimed in claim 11, wherein said stripe has a variable size, and truncating a full stripe depends on the number of disks of a plurality of disks in the disk storage system.

16. The method as claimed in claim 13, wherein said HEU is formed by N super erase units (SEUs) not restricted to a same full stripe, and said N SEUs are selected from M recycle SEUs, where both M and N are integers greater than 1 and M is greater than or equal to N.

17. The method as claimed in claim 11, wherein said method further includes:
   checking whether a corresponding parity distance being greater than or equal to a number of disks of a plurality of disks in said disk storage system;
   when said parity distance being equal to said number of disks, determining a broken page being a parity page, and setting its parity information as a parity value;
   when said parity distance being smaller than said number of disks, performing an XOR rebuilding from the ending of a previous stripe;
   when a result of said XOR rebuilding being 0, determining the broken page being a parity page, and setting its parity information as a parity value; and
   when said result of said XOR rebuilding being not 0, determining the broken page being a data page, and setting its parity information as a non-parity value.

18. The method as claimed in claim 17, wherein said method further includes:
   scanning said metadata area of an HEU to determine a plurality of parity pages of said metadata area; and
   computing said parity distance corresponding to each pair of parity pages of said plurality of parity pages.

19. A system for storing and rebuilding data, comprising:
   a processor, based on a parity, to determine whether a final stripe corresponding to an Input/Output command is a full stripe;
   a main hyper erase unit (HEU) configured in a disk storage system, to store a plurality of data and the parity corresponding to the Input/Output command when the final stripe is a full stripe; and
   a buffering HEU configured in the disk storage system, and the processor re-computes a final parity and writes repeatedly the final parity into at least two parity pages in the buffering HEU when the final stripe is not a full stripe; wherein the processor further performs rebuilding a plurality of data of at least one failed disk in the disk storage system.

20. The system as claimed in claim 19, wherein said rebuilding of a plurality of data of at least one failed disk of said disk storage system further includes:
   reading one parity page of at least two final parity pages from said buffering HEU of said disk storage system;
   based on information of said one parity page of said at least two final parity pages, rebuilding a partial stripe of said main HEU of said disk storage system;
   reading a parity page of each full stripe of at least one full stripe of said main HEU; and
   based on information of said parity page of the each full stripe, rebuilding each full stripe of said at least one full stripe.

21. A system for storing and rebuilding data, comprising:
   a processor, based on an Input/Output command, to compute a parity and determine whether a stripe is full by using a plurality of accumulated pages;
   a main hyper erase unit (HEU) configured in a disk storage system, to store the parity and data of each of the plurality of accumulated pages into a designated stripe, wherein the parity is used to identify an ending of the stripe; and
   a metadata area configured in an HEU of the disk storage system, to store a logical page number and a parity information corresponding to each of the plurality of pages;
   wherein the processor further performs rebuilding a plurality of data of at least one failed disk of the disk storage system.

22. The system as claimed in claim 21, wherein said rebuilding the plurality of data of at least one failed disk of the disk storage system further includes:
   for each pair of adjacent parity pages of a plurality of parity pages in the metadata area, checking whether a corresponding parity distance being greater than or equal to a number of disks of a plurality of disks in said disk storage system;
   when said parity distance being equal to said number of disks, determining a broken page being a parity page, and setting its parity information as a parity value;
   when said parity distance being smaller than said number of disks, performing an XOR rebuilding from an ending of a previous stripe;
   when a result of said XOR rebuilding being 0, determining the broken page being a parity page, and setting its parity information as a parity value; and
   when the result of said XOR rebuilding being not 0, determining the broken page being a data page, and setting its parity information as a non-parity value.

23. The system as claimed in claim 22, wherein said stripe has a variable size, and truncating a full stripe depends on at least one status of said Input/Output command.

24. The system as claimed in claim 22, wherein said stripe has a variable size, and truncating a full stripe depends on the number of disks of the plurality of disks in the disk storage system.

25. The system as claimed in claim 21, wherein a spare page of each said page stores a flag to indicate whether said page stores a parity or a data.

* * * * *